United States Patent
Kise et al.

(10) Patent No.: US 9,945,710 B2
(45) Date of Patent: Apr. 17, 2018

(54) HIGH LIQUID-LEVEL ALARM DEVICE

(71) Applicant: Musasino Co., Ltd., Tokyo (JP)

(72) Inventors: Masayuki Kise, Tokyo (JP); Akihiro Muraishi, Tokyo (JP)

(73) Assignee: Musasino Co., Ltd., Tokyo (JP)

( * ) Notice: Subject to any disclaimer, the term of this patent is extended or adjusted under 35 U.S.C. 154(b) by 0 days.

(21) Appl. No.: 15/652,822

(22) Filed: Jul. 18, 2017

(65) Prior Publication Data

US 2018/0058898 A1 Mar. 1, 2018

(30) Foreign Application Priority Data

Aug. 25, 2016 (JP) ................................. 2016-164541

(51) Int. Cl.
*G01F 23/284* (2006.01)

(52) U.S. Cl.
CPC ................................. *G01F 23/284* (2013.01)

(58) Field of Classification Search
CPC .. G01F 23/284; G01F 23/265; G01F 23/0069; G01S 7/292; G01S 7/4017; G01S 13/88
See application file for complete search history.

(56) References Cited

U.S. PATENT DOCUMENTS

| 6,414,625 | B1 | 7/2002 | Kleman | |
| 6,765,524 | B2 * | 7/2004 | Kleman | G01F 23/284 |
| | | | | 342/124 |
| 6,922,150 | B2 | 7/2005 | Hall et al. | |
| 7,265,558 | B1 * | 9/2007 | Penndal | G01F 23/284 |
| | | | | 324/637 |
| 7,701,385 | B2 * | 4/2010 | Edvardsson | G01F 23/284 |
| | | | | 342/124 |
| 7,826,309 | B2 * | 11/2010 | Spanke | G01F 23/28 |
| | | | | 367/908 |
| 9,778,089 | B2 * | 10/2017 | Edvardsson | G01F 23/284 |
| 2002/0020216 | A1 * | 2/2002 | Schultheiss | G01F 23/284 |
| | | | | 73/290 V |
| 2004/0036617 | A1 * | 2/2004 | Hall | F17C 13/021 |
| | | | | 340/612 |

(Continued)

FOREIGN PATENT DOCUMENTS

| JP | 61-79113 | 4/1986 |
| JP | 62-166507 | 7/1987 |

(Continued)

*Primary Examiner* — An T Nguyen
(74) *Attorney, Agent, or Firm* — Whitham, Curtis & Cook, P.C.

(57) ABSTRACT

A high liquid-level alarm device is configured such that one casing includes a plurality of liquid-level alarm units, the liquid-level alarm units are directed for monitoring one liquid level, issue an alarm for a different height of the liquid level, have radio wave detection units for detecting a radio wave, respectively, each of the liquid-level alarm units has a radio wave detection unit for detecting a radio wave, transmits a radio wave when not detecting a radio wave, and performs a determination operation as to whether a predetermined liquid level is reached, and when one of the liquid-level alarm units is performing the determination operation, the rest of the liquid-level alarm units do not perform the determination operation.

12 Claims, 4 Drawing Sheets

(56) References Cited

U.S. PATENT DOCUMENTS

| | | | | |
|---|---|---|---|---|
| 2005/0017895 A1* | 1/2005 | Andersson | ............ | G01F 23/284 342/124 |
| 2006/0044145 A1* | 3/2006 | Akerstrom | ............ | G01F 23/284 340/612 |
| 2008/0074309 A1* | 3/2008 | Nilsson | ................ | G01F 23/284 342/124 |
| 2008/0302439 A1* | 12/2008 | Spanke | .................. | G01F 23/28 141/1 |
| 2009/0235737 A1* | 9/2009 | Lavon | .................. | G01F 23/284 73/290 V |
| 2009/0289835 A1* | 11/2009 | Edvardsson | .......... | G01F 23/284 342/124 |
| 2012/0084055 A1* | 4/2012 | Smithson | .............. | E21B 47/042 702/166 |
| 2012/0323503 A1* | 12/2012 | Welle | ...................... | G01F 23/26 702/55 |
| 2013/0009803 A1* | 1/2013 | Edvardsson | .......... | G01F 23/284 342/124 |
| 2014/0208845 A1* | 7/2014 | Zlotnick | ................ | G01F 22/00 73/290 V |
| 2015/0331093 A1 | 11/2015 | Pandharipande et al. | | |
| 2016/0202105 A1* | 7/2016 | Baer | ........................ | G01S 7/03 324/633 |

FOREIGN PATENT DOCUMENTS

| | | |
|---|---|---|
| JP | 8-159842 | 6/1996 |
| JP | 2003-503724 | 1/2003 |
| JP | 2005-536737 | 12/2005 |
| JP | 2006-257457 | 9/2006 |
| JP | 2011-521257 | 7/2011 |
| JP | 4818144 | 11/2011 |
| JP | 2016-507728 | 3/2016 |

\* cited by examiner

HIGH LIQUID-LEVEL ALARM DEVICE

BACKGROUND

Technical Field

The present invention relates to a high liquid-level alarm device.

Related Art

There has been known a high liquid-level alarm device for detecting that the liquid level of a tank storing liquid or the like therein reaches a predetermined height in the tank and issuing an alarm.

Conventionally, when there are a plurality of heights to be alarmed, the numbers of all the components other than a casing for housing a sensor need to be plural.

Japanese Patent Registration No. 4818144 discloses a high liquid-level alarm device which has a vertical rod body for fixing a sensor at a predetermined height in a tank and connecting it to the main body and is directed for issuing an alarm when the sensor detects the liquid level. Further, JP 8-159842 A discloses a high liquid-level detection device in which an insulative plate is provided at the lower end of a vertical rod body such as metallic vertical rod body including an transmission device and a reception device via an grounded coupling rod.

Japanese Translation of PCT International Application Publication No. 2003-503724 discloses a configuration in which associated waves, which are mutually distinguishable by the characteristics of each detectable channel, are transmitted in at least one different radar measurement channel via the same antenna.

SUMMARY

It is an object of the present invention to provide a high liquid-level alarm device capable of monitoring a plurality of alarm points in a simple configuration in monitoring the liquid level of a tank storing liquid or the like therein.

A high liquid-level alarm device according to the present invention is a high liquid-level alarm device in which a plurality of liquid-level alarm units are provided in one casing, wherein the plurality of liquid-level alarm units are directed for monitoring one liquid level, the liquid-level alarm units issue an alarm for a different height of the liquid level, respectively, each of the liquid-level alarm units has a radio wave detection unit for detecting a radio wave, transmits a radio wave when not detecting a radio wave, and performs a determination operation as to whether a predetermined liquid level is reached, and when one of the liquid-level alarm units is performing the determination operation, the rest of the liquid-level alarm units do not perform the determination operation.

According to the present invention, it is possible to monitor a plurality of alarm points in a simple configuration in monitoring the liquid level of a tank storing liquid or the like therein.

DETAILED DESCRIPTION

[High Liquid-Level Alarm Device]

An embodiment of a high liquid-level alarm device according to the present invention will be described below with reference to the accompanying drawings.

[Outline of High Liquid-Level Alarm Device]

A high liquid-level alarm device 1 is directed for determining a height of the liquid level in a tank storing liquid or the like therein in a radio wave system, and issuing an alarm when the liquid level is at a predetermined height.

[Configuration of High Liquid-Level Alarm Device]

Figure 1:
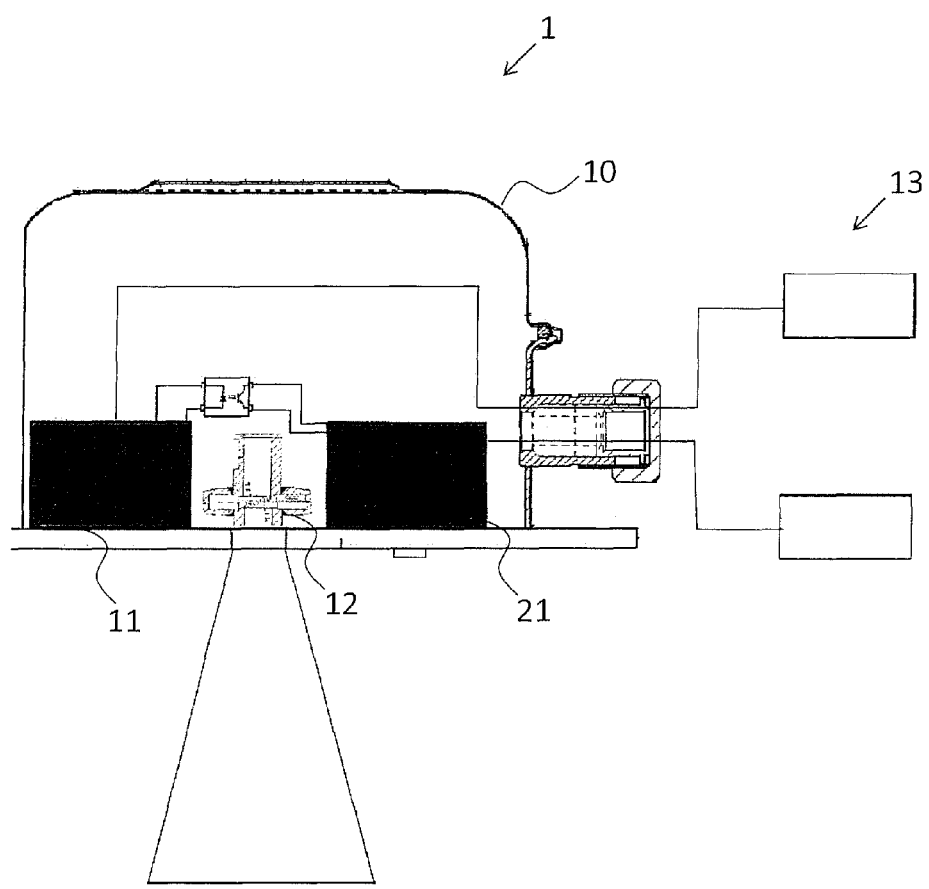
FIG. 1 is a configuration diagram illustrating an embodiment of a high liquid-level alarm device according to the present invention.

As illustrated in FIG. 1, the high liquid-level alarm device 1 includes a casing 10, a first liquid-level alarm unit 11, a second liquid-level alarm unit 21, an antenna 12, and a upper controller 13. The first liquid-level alarm unit 11, the second liquid-level alarm unit 21, and the antenna 12 are arranged in one casing 10.

The first and second liquid-level alarm units 11 and 21 are connected to the common transmission/reception antenna 12. The first and second liquid-level alarm units 11 and 21 transmit a radio wave from the antenna 12 toward the liquid level and receive a wave reflected on the liquid level thereby to determine whether the liquid level in the tank reaches a predetermined height or an alarm point. When the liquid level reaches the alarm point, the first and second liquid-level alarm units 11 and 21 display the fact on a user interface 2 (denoted as "UI 2" below) in FIG. 2. A user can grasp the height of the liquid level in the tank via the UI 2.

The first liquid-level alarm unit 11 and the second liquid-level alarm unit 21 can monitor different liquid levels as alarm points. For example, the first liquid-level alarm unit 11 and the second liquid-level alarm unit 21 can be set as high liquid-level alarm unit and overflow alarm unit, respectively. The high liquid-level alarm unit is directed for preliminarily alarming that the liquid in the tank exceeds the predetermined amount. The overflow alarm unit is directed for alarming that the liquid level of the liquid in the tank reaches the limit beyond the alarm point of the high liquid-level alarm unit.

As described above, the high liquid-level alarm device 1 can monitor two alarm points by use of one antenna 12.

The high liquid-level alarm device 1 includes two liquid-level alarm units according to the present embodiment, but may include three or more liquid-level alarm units.

The high liquid-level alarm device 1 may have a function of always comparing and calibrating the reference position and a determined position by determining of an object, a reference position of which can be determined by a radio wave, inside a tank. Specifically, the object, the position of which is predefined relative to the high liquid-level alarm device 1, is installed in the tank. The object is a planar protrusion with a reflective plate orthogonal to the measurement direction of the high liquid-level alarm device 1, for example, but may have any shape. The position of the object relative to the high liquid-level alarm device 1, or the reference position is stored in the upper controller 13 or the like. The high liquid-level alarm device 1 periodically determines an actual position of the high liquid-level alarm device 1 relative to the object, and compares it with the reference position. When the determined position is different from the reference position, the high liquid-level alarm device 1 calibrates the liquid-level determination result on the basis of the determined position and the reference position. When the determined position is largely different from the reference position, the high liquid-level alarm device 1 issues an alarm via the UI 2, and notifies a user of the fact that the high liquid-level alarm device 1 may not being correctly operating.

[Configuration of Liquid-Level Alarm Units]

Figure 2:
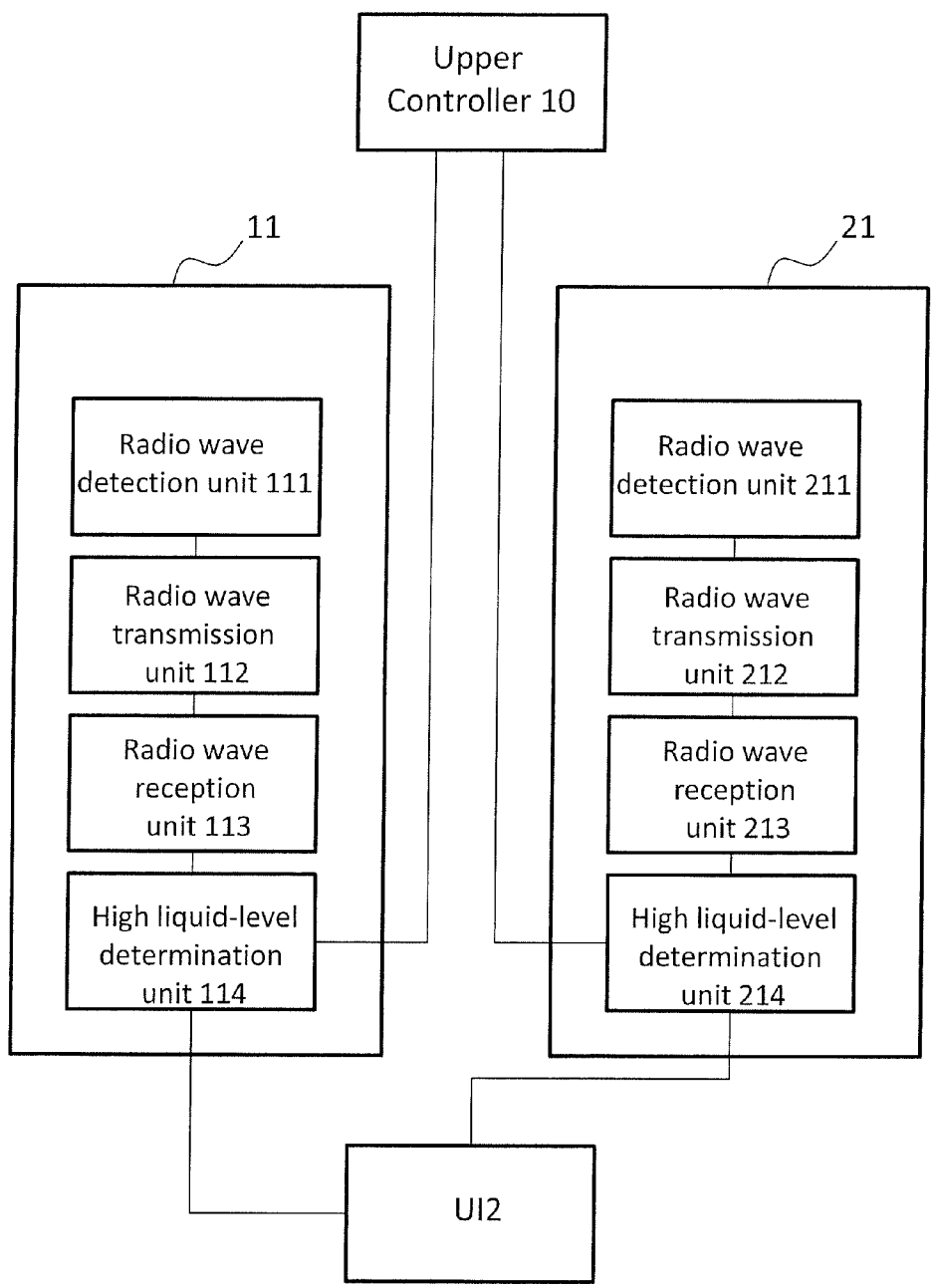
FIG. 2 is a functional block diagram of the high liquid-level alarm device.

As illustrated in FIG. 2, the first liquid-level alarm unit 11 includes a radio wave detection unit 111, a radio wave transmission unit 112, a radio wave reception unit 113, and a high liquid-level determination unit 114. Further, the second liquid-level alarm unit 21 includes a radio wave detection unit 211, a radio wave transmission unit 212, a radio wave reception unit 213, and a high liquid-level determination unit 214 similarly to the first liquid-level alarm unit. That is, the functional blocks of the first liquid-level alarm unit 11 and the second liquid-level alarm unit 21 are the same. In order words, the circuit configurations of the first liquid-level alarm unit 11 and the second liquid-level alarm unit 21 are the same.

Each of the high liquid-level determination units 114 and 214 is connected to the UI 2. Each of the high liquid-level determination units 114 and 214 notifies the user of the fact that the liquid level reaches the alarm point via the UI 2.

The alarm points of the first liquid-level alarm unit 11 and the second liquid-level alarm unit 21 are rewritable in software. The first liquid-level alarm unit 11 and the second liquid-level alarm unit 21 are connected to the upper controller 13 storing the respective alarm points. The alarm points stored in the upper controller 13 are rewritten, thereby changing the alarm points of the respective liquid-level alarm units 11 and 21 without a physical design change. With the configuration, the size of a product does not need to be determined depending on a distance to be alarmed. That is, mass-productivity of the device remarkably enhances.

The alarm points of the first liquid-level alarm unit 11 and the second liquid-level alarm unit 21 may be stored in the upper controller 13 as described above, or may be stored in the liquid-level alarm units 11 and 21, respectively.

The alarm points of the first liquid-level alarm unit 11 and the second liquid-level alarm unit 21 may be manually rewritten by the user as described above, or may be automatically changed by the upper controller 13. For example, a high liquid-level determination processing S4 described below is repeatedly performed at certain intervals, and thus the alarm points to be monitored may be periodically changed whenever the high liquid-level determination processing S4 is performed. Specifically, the liquid-level determination is made assuming the alarm point at liquid level A in the first high liquid-level determination processing S4, liquid level B different from liquid level A in the second high liquid-level determination processing S4, and liquid level C different from liquid level A and liquid level B in the third high liquid-level determination processing S4, which are repeatedly performed after the fourth high liquid-level determination processing S4. In this case, liquid levels A, B, and C can be monitored by one liquid-level alarm unit.

In this way, the configuration in which the alarm points are automatically changed enables one liquid-level alarm unit to monitor a plurality of alarm points. The kinds of alarm may be a lower liquid-level notice alarm than the alarm points of high liquid-level alarm in addition to high liquid-level alarm and overflow alarm. A notice alarm can be issued, thereby more accurately monitoring the liquid level.

Further, with the configuration in which the alarm points are automatically changed, also when one liquid-level alarm unit breaks down, the alarm point to be monitored by the broken-down unit can be monitored by the other liquid-level alarm unit. For example, the second liquid-level alarm unit 21 detects that the first liquid-level alarm unit 11 has broken down, and alternately determines the alarm point of the first liquid-level alarm unit 11 and the alarm point of the second liquid-level alarm unit 21 in the high liquid-level determination processing S4 repeatedly performed at certain intervals. Similarly, when the second liquid-level alarm unit 21 breaks down, the first liquid-level alarm unit 11 can alternately determine the alarm points of the first and second liquid-level alarm units 11 and 21. That is, one of the two liquid-level alarm units 11 and 21 is complementary to the other to operate.

[Flowchart of Liquid-Level Alarm Units]

The operations of the first liquid-level alarm unit 11 and the second liquid-level alarm unit 21 will be described with reference to FIG. 4. The operations of the first liquid-level alarm unit 11 will be first described.

The first liquid-level alarm unit 11 initializes (S0), and then performs a radio wave detection processing by the radio wave detection unit 111 (S1). When the radio wave detection unit 111 detects a radio wave of the second liquid-level alarm unit 21, the first liquid-level alarm unit 11 does not transmit a radio wave, and performs the radio wave detection processing S1 again after a certain time. When the radio wave detection unit 111 does not detect a radio wave of the second liquid-level alarm unit 21, the first liquid-level alarm unit 11 performs a radio wave transmission processing of transmitting a radio wave toward the liquid level (S2). That is, the first liquid-level alarm unit 11 determines whether the second liquid-level alarm unit 21 is transmitting a radio wave in the radio wave detection processing S1.

The first liquid-level alarm unit 11 then performs a reflected wave detection processing of detecting a radio wave reflected on the liquid level (S3). The first liquid-level alarm unit 11 performs a high liquid-level determination processing of determining whether a height of the liquid level reaches the alarm point on the basis of the information on the reflected wave detected in the reflected wave detection processing S3 (S4). When the height of the liquid level reaches the alarm point, an alarm is issued to the user via the UI 2 (S5). The first liquid-level alarm unit 11 repeatedly performs the processing at certain intervals.

The above-described processing are similarly performed by the second liquid-level alarm unit 21. The second liquid-level alarm unit 21 detects the presence of a radio wave transmitted from the first liquid-level alarm unit 11 in the radio wave detection processing S1.

[Time Chart of First and Second Liquid-Level Alarm Units]

Figure 3:
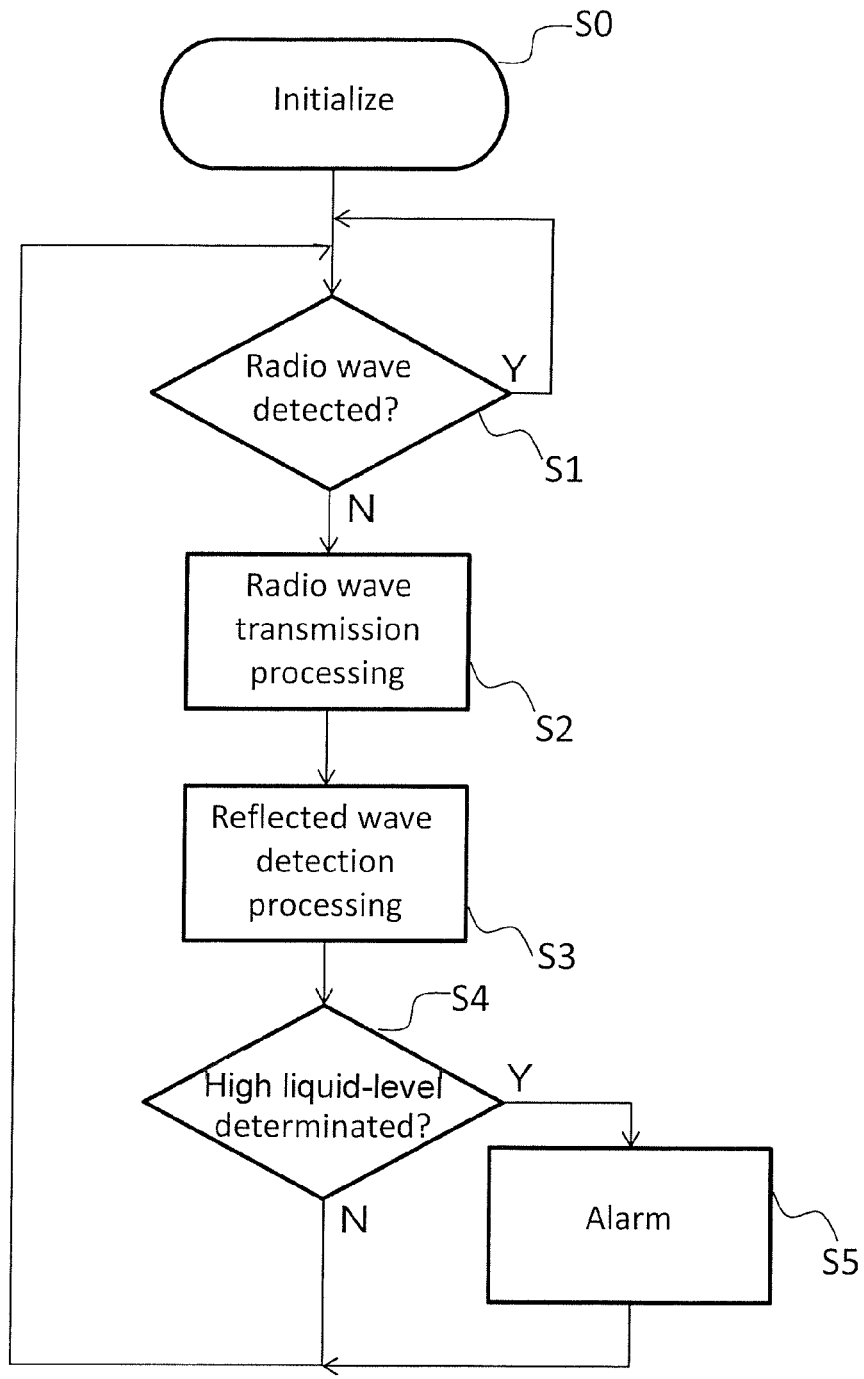
FIG. 3 is a flowchart illustrating the operations of liquid-level alarm units provided in the high liquid-level alarm device.
Figure 4:
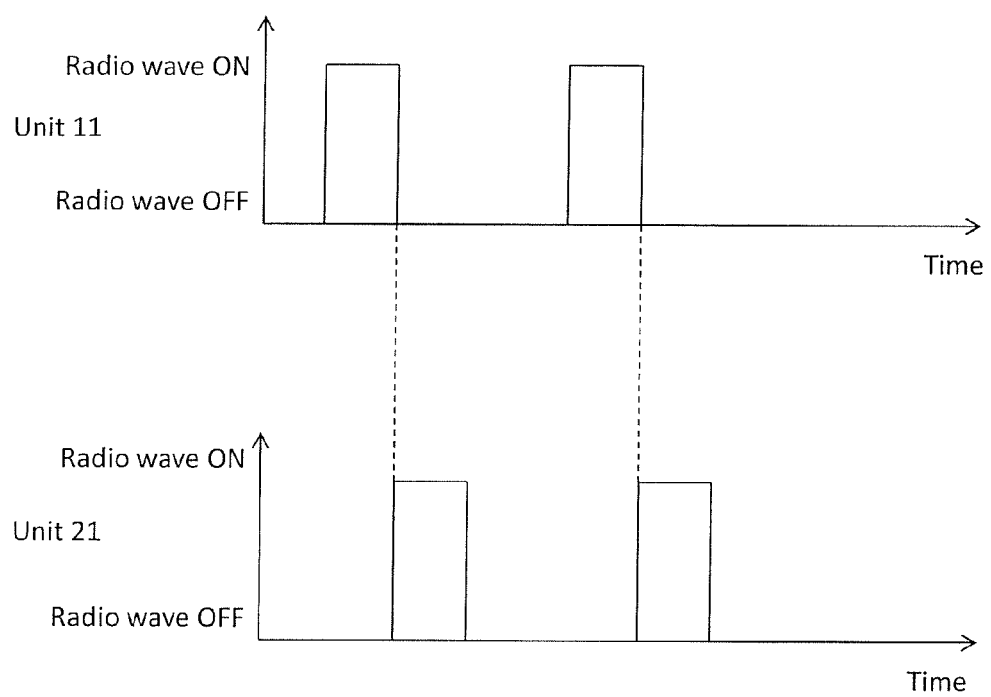
FIG. 4 is a time chart illustrating how two liquid-level alarm units provided in the high liquid-level alarm device operate.

As illustrated in FIG. 4, the first and second liquid-level alarm units 11 and 21 transmit a radio wave for high liquid-level determination at certain intervals, respectively. As illustrated in FIG. 3, each liquid-level alarm unit detects whether the counterpart liquid-level alarm unit is transmitting a radio wave by the radio wave detection unit 111, 211, and does not transmit a radio wave when the counterpart liquid-level alarm unit is transmitting a radio wave. Thus, the first and second liquid-level alarm units 11 and 21 alternately transmit a radio wave toward the liquid level. In other words, the first and second liquid-level alarm units 11 and 21 monitor two alarm points by one antenna under time division control.

In this way, the first liquid-level alarm units 11 and 21 have the same circuit configuration and can alternately transmit a radio wave. The configuration of the device can be simplified by use of the units in the same circuit configuration.

The first and second liquid-level alarm units 11 and 21 may have a function of determining whether their counterpart liquid-level alarm unit is correctly operating on the basis of a reception state of a radio wave transmitted from the counterpart liquid-level alarm unit. The function may be realized by monitoring a radio wave transmitted from the counterpart liquid-level alarm unit by the radio wave detection unit and displaying a different alarm from the liquid-level alarm on the UI 2 when a radio wave has not been received for a predetermined time.

The first and second liquid-level alarm units 11 and 21 may be previously defined with a timing of transmitting a radio wave such that they transmit the radio wave when the counterpart liquid-level alarm unit is not transmitting a radio wave. At this time, each liquid-level alarm unit includes a detection processing function of determining whether the counterpart liquid-level alarm unit is transmitting a radio wave. The detection processing is realized by a communication means among a plurality of mounted liquid-level alarm units. Specifically, a determination is made as to whether the counterpart liquid-level alarm unit is transmitting a radio wave in an optical coupling system using a photo coupler or in an electromagnetic coupling system using insulative transformer.

The first and second liquid-level alarm units 11 and 21 may monitor two alarm points by one antenna 12 under frequency division control. That is, the frequency of a radio wave transmitted from the antenna 12 by the first liquid-level alarm unit 11 may be different from the frequency of a radio wave transmitted from the antenna 12 by the second liquid-level alarm unit 21. In this case, the radio waves transmitted by the first and second liquid-level alarm units 11 and 21 do not interfere with each other, and thus the two liquid-level alarm units can monitor different alarm points at the same time.

What is claimed is:

1. A high liquid-level alarm device in which a plurality of liquid-level alarm units are provided in one casing,
   wherein the plurality of liquid-level alarm units are directed for monitoring one liquid level,
   the liquid-level alarm units issue an alarm for a different height of the liquid level, respectively,
   each of the liquid-level alarm units has a radio wave detection unit for detecting a radio wave, transmits a radio wave when not detecting a radio wave, and performs a determination operation as to whether a predetermined liquid level is reached, and
   when one of the liquid-level alarm units is performing the determination operation, the rest of the liquid-level alarm units do not perform the determination operation,
   wherein each of the liquid-level alarm units determines whether the rest of the liquid-level alarm units are correctly operating on the basis of reception states of radio waves transmitted from the rest of the liquid-level alarm units,
   wherein the plurality of liquid-level alarm units include a first liquid-level alarm unit and a second liquid-level alarm unit,
   wherein the first liquid-level alarm unit monitors a first liquid level,
   wherein the second liquid-level alarm unit monitors a second liquid level which is different from the first liquid level, and
   wherein when the first liquid-level alarm unit is not correctly operating, the second liquid-level alarm unit issues an alarm for the height of the first liquid level.

2. The high liquid-level alarm device according to claim 1,
   wherein the liquid-level alarm units include a high liquid-level alarm unit and an overflow alarm unit.

3. The high liquid-level alarm device according to claim 1,
   wherein each of the liquid-level alarm units is previously defined with a timing of transmitting a radio wave such that each of the liquid-level alarm units transmits the radio wave when the rest of the liquid-level alarm units do not transmit a radio wave.

4. The high liquid-level alarm device according to claim 1,
   wherein the liquid-level alarm units are connected to a common antenna, and transmit and receive the radio wave via the antenna.

5. The high liquid-level alarm device according to claim 1,
   wherein the liquid-level alarm units have the same circuit configuration.

6. The high liquid-level alarm device according to claim 1,
   wherein the heights of the liquid level for which the liquid-level alarm units issue an alarm are stored in a controller connected to the liquid-level alarm units.

7. The high liquid-level alarm device according to claim 1,
   wherein the heights of the liquid level for which the liquid-level alarm units issue an alarm can be changed in software.

8. The high liquid-level alarm device according to claim 1,
   wherein the heights of the liquid level for which the liquid-level alarm units issue an alarm can be automatically changed.

9. The high liquid-level alarm device according to claim 2,
   wherein the liquid-level alarm units automatically change the heights of the liquid level to be alarmed thereby to issue a notice alarm before an alarm point of the high liquid-level alarm unit is reached.

10. The high liquid-level alarm device according to claim 1, further including an object disposed at a reference position,
    periodically determines a position of the object,
    wherein when a position of the object is different from the reference position, calibrates a determination result of the determination operation on the basis of the position of the object and the reference position.

11. The high liquid-level alarm device according to claim 1,
    wherein the frequencies of radio waves transmitted from the liquid-level alarm units are different.

12. The high liquid-level alarm device according to claim 1,
    wherein two liquid-level alarm units are provided, and the two liquid-level alarm units alternately perform the determination operation.

* * * * *